INVENTOR.
EVE ELLISON
BY Ely, Pearne & Gordon
ATTORNEYS

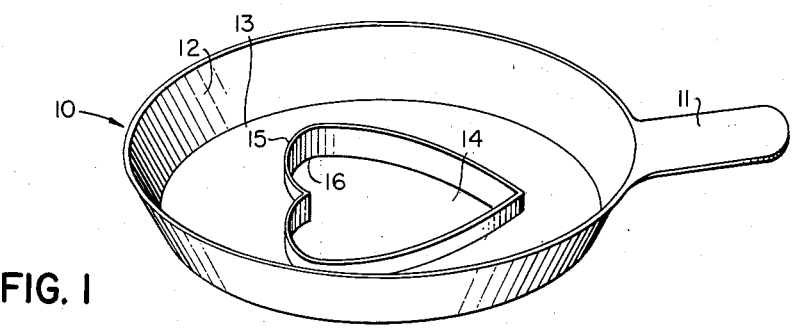
FIG. 1
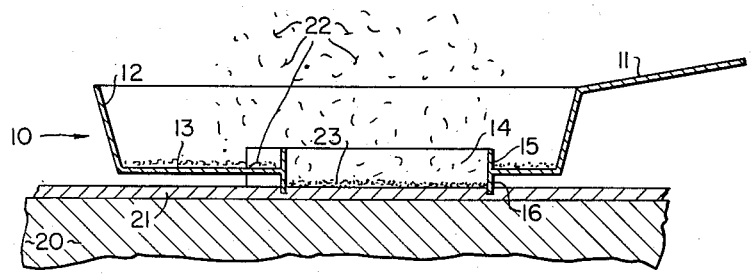
FIG. 2
FIG. 3
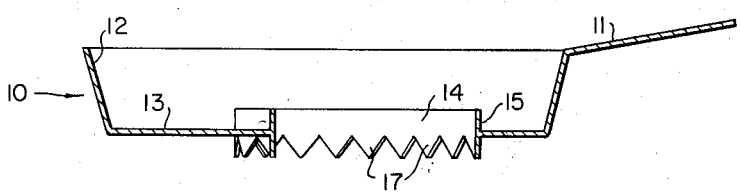
FIG. 4
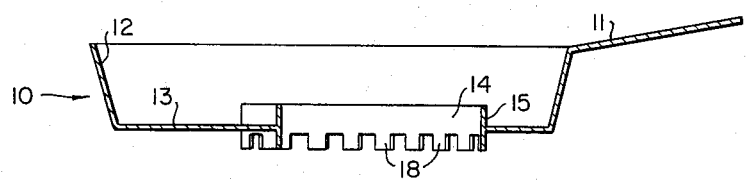
FIG. 5
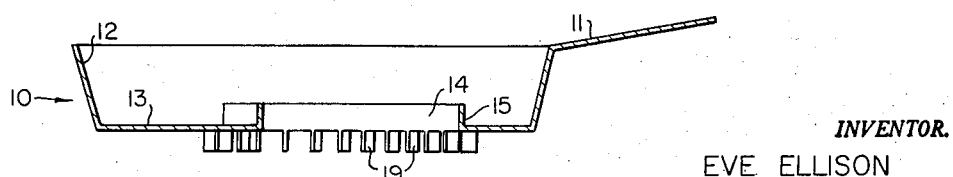
INVENTOR.
EVE ELLISON
BY Ely, Pearne & Gordon
ATTORNEYS Sept. 13, 1960     E. ELLISON     2,952,225
FOOD DECORATING STENCIL Original Filed July 2, 1956     2 Sheets-Sheet 2

United States Patent Office 2,952,225
Patented Sept. 13, 1960

2,952,225
FOOD DECORATING STENCIL
Eve Ellison, 1304 Gordon Road, Lyndhurst 24, Ohio
Substituted for abandoned application Ser. No. 595,222, July 2, 1956. This application Apr. 15, 1960, Ser. No. 22,642

1 Claim. (Cl. 107—47)

This invention relates to food decorating devices and more particularly to a stencil for decorating cookies, cake icing and the like.

According to the invention there is provided a stencil device which enables decorating ingredients (such as colored or plain sugar, spices, chopped nuts and the like) to be readily applied in sharply defined, set-off designs of professional appearance and in such a way that the stencil can be used repetitively without the necessity of cleaning the bottom of the stencil between each contact with the article of food being decorated.

An object of the invention is to provide a device having the above advantages and which is at the same time adapted to low cost manufacture. A less general object is to provide an arrangement whereby the general advantages of the invention can be realized in connection with a plurality of stencil designs, without multiplying the cost of the device, by providing interchangeable stencil plates. Another object of the invention is to accomplish all the above in such a way that spare stencils can be self-stored within the device. Still another object is to provide means for interconnecting the device with the several stencils in a manner that is very simple but which precludes accidental leakage of decorating materials through the interconnection.

These and other objects and advantages of the invention will become more fully apparent from the following description of specific examples thereof, which description refers to the accompanying drawings. In the drawings:

Figure 1 is a perspective view of a device embodying the invention.

Figure 2 is a vertical section of the device shown in Figure 1 in association with an article of food being decorated.

Figures 3, 4, and 5 are vertical sections of devices similar to the one shown in Figure 1 and also embodying the invention.

Figures 6, 7, 8, and 9 are illustrations of the designs produced by the devices shown in Figures 1, 3, 4, and 5, respectively.

Figure 10:
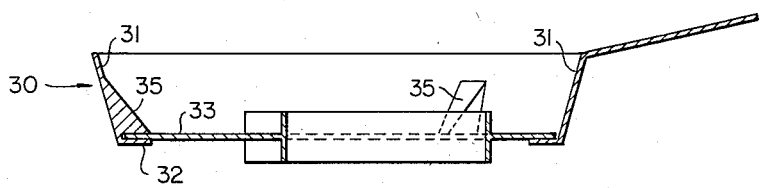

Figure 10 is a vertical section of a device similar to the one shown in Figure 1 and also embodying the invention.

Figure 11:
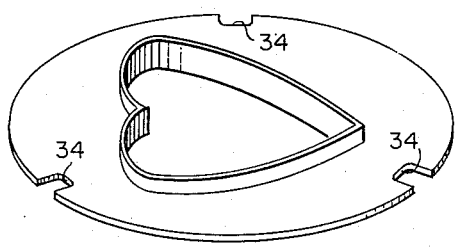

Figure 11 is a perspective view of part of the device shown in Figure 10.

As shown in Figures 1 and 2, the invention may be embodied in a shallow pan, generally indicated at 10, which is provided with a suitable handle 11. The upstanding edge wall 12 of the pan 10 is preferably flared outwardly from bottom to top to allow compact stacking of the illustrated pan with similar pans. The bottom wall 13 of the pan is provided with a stencil opening 14 of any desired shape, in this case a heart. At the periphery of the stencil opening 14 there is provided an upstanding rim 15 and also means which extends downwardly a short distance below the bottom wall 13. In the device shown in Figures 1 and 2, this means comprises a continuous rim 16, which has the same form as the rim 15 but which extends in the opposite direction.

Throughout the drawings, like elements are given the same reference numbers. In the device shown in Figure 3, the elements 10 to 15 are similar to those of the device shown in Figures 1 and 2. However, the continuous rim 16 is replaced by a series of sawtooth projections 17. Again, in the devices shown in Figures 4 and 5, the elements 10 to 15 are similar to those of the device shown in Figures 1 and 2. However, in Figure 4 the means which extends downwardly a short distance below the bottom wall 13 comprises an interrupted rim 18. In Figure 5, the downwardly extending means comprises a series of radial strips 19.

The device shown in Figures 1 and 2 is illustrated in Figure 2 in association with an article of food being decorated, such as a cake 20 coated with icing 21. Indicated at 22 are the decorating ingredients, which may be colored or plain sugar, spices, chopped nuts, or the like. The decorating ingredients are scattered over the stencil opening, and those which miss the mark are caught on the bottom wall 13. The decorating ingredients which fall through the stencil opening are deposited on the icing as a decorative coating 23. The underside of the wall 10 is spaced above the icing by the rim 16, which also indents the icing to set off the decorative coating 23 by forming a depression around its boundary. When the coating 23 is deposited, the device may be shifted to the next location to make a repetitive pattern, or may be used on another article of food (as in the case of decorating a number of cookies). As the device is lifted, dropping of the excess decorating ingredients caught on the top of the bottom wall 10 is prevented by the rim 15, and the clean condition of the underside of the bottom wall 10 enables the device to be repositioned without cleaning and yet without any possibility of marring the new surface to be decorated.

Figure 6:
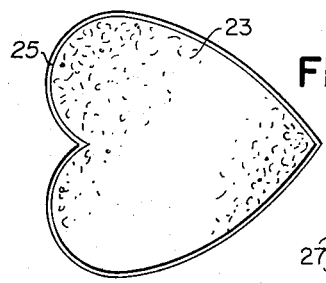
Figure 7:
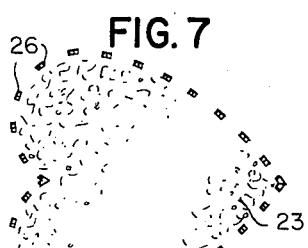
Figure 8:
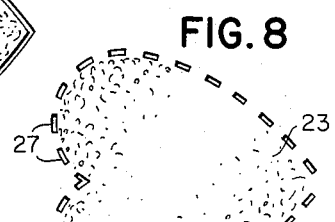
Figure 9:
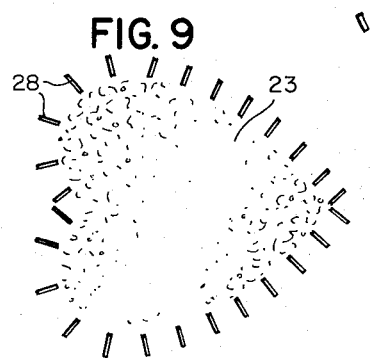

The devices shown in Figures 3, 4 and 5 all function in a similar manner. The device shown in Figure 1 produces a decoration in which the coating 23 is surrounded and set off by a continuous line of indentation 25, as shown in Figure 6. The devices shown in Figures 3 and 4 provide discontinuous lines of indentations 26 and 27, respectively, as shown in Figures 7 and 8. The device shown in Figure 5 provides radially extending indentations 28, as shown in Figure 9.

In Figure 10, the device is shown enbodied in a pan, indicated at 30. The upstanding edge wall 31 of the pan 30 is provided with a lower flange 32, which supports a removable bottom wall 33. The bottom wall 33 may be one of a number of similar interchangeable bottom walls, which are provided with a variety of stencil openings to provide an assortment of decorations, and each being provided with structure similar to the upstanding rim 15 and to the depending means 16, 17, 18 or 19. The bottom walls 33 are provided with notches 34. Spaced slightly above the flange 32 are corresponding projections 35. The notches 34 can be slipped down over the projections 35, and the bottom wall twisted to secure the bottom wall in position in the device, the notches 34 and projections 35 cooperating as a bayonet connection in a manner which will be apparent. The depth of the notches 34 is less than the width of the flange 32, so that the flange 32 underlies the notches and prevents excess decorating materials from dropping through the notches. In storage, the additional interchangeable bottom walls may be stacked within the pan 30. If necessary for this purpose, their notches 34 may be aligned with the projections 35.

The above description of embodiments of the invention is made by way of example, and the invention is not necessarily limited to the inclusion of all the specific details thereof, but is defined by the following claim.

What is claimed is:

A food decorating stencil comprising a shallow pan having an upstanding edge wall around its periphery and having a substantially flat bottom wall separable from said edge wall, a flange at the bottom and on the radially inner side of said side wall for supporting said bottom wall within said pan, said bottom wall having notches in its edge, projections on the inner side of said side wall and spaced above said flange and cooperating with the notched edge of said bottom wall to form a bayonet connection, said flange underlying said notches for preventing excess decorating materials from dropping through said notches, a stencil opening in said bottom wall, an upwardly extending rim around the periphery of said opening, and means positioned around said stencil opening periphery and extending downwardly a short distance below said bottom wall for impressing the food being stencilled to set off the stencilled decoration and for maintaining said bottom wall above the food being stencilled to maintain the bottom wall clean.

References Cited in the file of this patent

UNITED STATES PATENTS

| | | |
|---|---|---|
| 212,952 | Krier et al. | Mar. 4, 1879 |
| 296,327 | Ghezzi | Apr. 8, 1884 |
| 1,730,271 | Furnaro | Oct. 1, 1929 |
| 1,811,167 | Anderson et al. | June 23, 1931 |
| 2,008,097 | Parker | Sept. 24, 1935 |

FOREIGN PATENTS

| | | |
|---|---|---|
| 381,784 | France | Nov. 20, 1907 |
| 508,328 | Great Britain | June 29, 1939 |